United States Patent [19]

Borgato et al.

[11] Patent Number: 5,589,759
[45] Date of Patent: Dec. 31, 1996

[54] CIRCUIT FOR DETECTING VOLTAGE VARIATIONS IN RELATION TO A SET VALUE, FOR DEVICES COMPRISING ERROR AMPLIFIERS

[75] Inventors: Pierandrea Borgato, Lomagna; Claudio Diazzi, Milan; Albino Pidutti, Udine, all of Italy

[73] Assignee: SGS-Thomson Microelectronics S.r.l., Agrate Brianza, Italy

[21] Appl. No.: 100,482

[22] Filed: Jul. 30, 1993

[30] Foreign Application Priority Data

Jul. 30, 1992 [EP] European Pat. Off. ............ 92830428

[51] Int. Cl.⁶ ..................................... G05F 1/63
[52] U.S. Cl. ......................... 323/222; 323/285; 363/80
[58] Field of Search .................................. 323/222, 283, 323/282, 284, 272, 285; 363/80, 89

[56] References Cited

U.S. PATENT DOCUMENTS

| | | | |
|---|---|---|---|
| 4,204,219 | 5/1980 | Uchida | 358/155 |
| 4,542,330 | 9/1985 | Terbrack | 323/222 |
| 4,549,118 | 10/1985 | Cole et al. | 315/393 |
| 4,701,720 | 10/1987 | Monticelli | 330/260 |
| 4,924,170 | 5/1990 | Henze | 323/272 |
| 4,940,929 | 7/1990 | Williams | 323/222 |
| 5,146,398 | 9/1992 | Vila-Masot et al. | 363/89 |
| 5,177,676 | 1/1993 | Inam et al. | 363/80 |
| 5,349,284 | 9/1994 | Whittle | 323/207 |
| 5,404,093 | 4/1995 | Cowett, Jr. | 323/207 |

FOREIGN PATENT DOCUMENTS

| | | |
|---|---|---|
| 0123745 | 11/1984 | European Pat. Off. . |
| 0369118 | 5/1990 | European Pat. Off. . |
| 0431778 | 6/1991 | European Pat. Off. . |
| 0473925 | 3/1992 | European Pat. Off. . |
| WO-A-8501621 | 4/1985 | WIPO . |

OTHER PUBLICATIONS

Soviet Patent Abstracts, Section EI, Week 882, Jun. 2, 1988, Derwent Publications Ltd., London, GB; Class U22, AN 88-154376 & SU-A-1350829 (Mosc Eng Phys Inst,) Nov. 7, 1987.

Patent Abstracts of Japan, vol. 016, No. 171 (P-1343) Apr. 24, 1992 & JP-A-4015887 (Mitsubishi Electric Corp.) Jan. 21, 1992.

Patent Abstracts of Japan, vol. 10, No. 119 (P-453) (2176) May 6, 1986 & JP-A-60247718 (Nitsushin Denki K.K.) Dec. 7, 1985.

Patent Abstracts of Japan, vol. 014, No. 452 (P-1112) Sep. 27, 1990 & JP-A-2181663 (Nissan Motor Co. Ltd.) Jul. 16, 1990.

Luptotto, P., et al., "Simple methods to improve the performances of network analysers in electrochemical analyses", J. Phys. E. Sci. Instrm, 20 (Jun. 1987), Part 1, No. 6, pp. 634–636.

Primary Examiner—Peter S. Wong
Assistant Examiner—Adolf Berhane
Attorney, Agent, or Firm—David M. Driscoll; James H. Morris

[57] ABSTRACT

A circuit for detecting voltage variations in relation to a set value, for devices, such as a power supply circuit, comprising an error amplifier fed back by a compensating capacitor which, under steady state operating conditions, is not supplied with current, and, in the presence of transient output voltage ($V_o$) of the device, is supplied with current (DI) proportional to the variation in voltage, the circuit comprising a current sensor connected to the compensating capacitor for detecting the current (DI) through the same; and the output signal of the sensor preferably being supplied to a circuit for limiting the variation in output voltage which, in the event the voltage variation exceeds a given threshold value ($V_{R1}$), activates a control stage connected to the output of the device.

25 Claims, 2 Drawing Sheets

CIRCUIT FOR DETECTING VOLTAGE VARIATIONS IN RELATION TO A SET VALUE, FOR DEVICES COMPRISING ERROR AMPLIFIERS

BACKGROUND OF THE INVENTION

1. Field of the Invention

The present invention relates to a circuit for detecting voltage variations in relation to a set value, for devices comprising error amplifiers. In particular, the present invention is especially suitable for use on boost-type switch power supply circuits for detecting and limiting overvoltages in relation to a set value.

2. Discussion of the Related Art

Power supply circuits convert an alternating-current ("AC") voltage into a given direct-current ("DC") output voltage. Boost-type switch power supply circuits use a control circuit to control the on-off operation of a power transistor, which, when on, permits the charging of an inductor to the current required for achieving a given output voltage (greater than the input voltage) and which, when off, allows the discharging of the inductor, via a diode, to a load. An output capacitor is provided for reducing the ripple produced by the switching of the power transistor.

A known circuit of the aforementioned type is shown by way of reference in FIG. 1, wherein the power supply circuit is indicated, as a whole, by 1 and substantially comprises a rectifying bridge 2 having input terminals 3, which receives a sinusoidal AC input voltage $V_M$, and output terminals 5 and 6. Bridge output terminal 5 is connected, via resistor 5a, to the input pin 7 of a control circuit 8, an integrated circuit. Terminal 6 is connected to a reference potential line 9 (ground). Bridge output terminal 5 is also connected to one terminal of winding 10 of transformer 11. The other terminal of winding 10 is connected to the anode of diode 12. A capacitor 13, load 14, and a divider 15, which includes resistors 16 and 17 and node 18 there between, are connected in parallel with one end of the parallel combination connected to the cathode of diode 12 and the other end grounded. Cathode 12a of diode 12 forms the output terminal of power supply circuit 1. Node 18 is connected to input pin 19 of control circuit 8.

Transformer 11 comprises a second winding 20 having one terminal grounded and the other terminal connected to pin 21 of control circuit 8, via resistor 20a, and also connected to the anode of diode 22. The cathode of diode 22 is connected to ground via a capacitor 23, and is also connected to pin 24 of control circuit 8.

Control circuit 8 substantially comprises an error amplifier 27 having the positive input connected to reference voltage $V_R$, and the negative input connected to input pin 19 of control circuit 8. A compensating capacitor 28 is connected to input pin 19 and pin 29. Capacitor 28 connects the negative input of amplifier 27 with the amplifier's output.

Compensating capacitor 28 is external to control circuit 8. The output of error amplifier 27 is connected to one input of a multiplier stage 30, which is within control circuit 8; second input of multiplier stage 30 is connected to pin 7. The output of multiplier stage 30 is connected to control stage 31, which is also connected to pin 24. The output of control stage 31 is connected, via pin 38, to the gate terminal of a power MOS transistor 34. Control stage 31 comprises the control logic for turning transistor 34 on and off and also provides for driving transistor 34. The drain terminal of transistor 34 is connected to the anode of diode 12, and the source terminal is connected to pin 35 of control circuit 8. Finally, a resistor 36 is provided between the source terminal of transistor 34 and ground, and control circuit 8 is connected to ground line 9, via pin 37.

A major drawback of the FIG. 1 circuit is that it fails to instantly eliminate sharp overvoltages at the output 12a, caused, for example, by a sharp variation in load 14. This is due to the limited response of control circuit 8, which must be so designed as to be unaffected by variations in output voltage of twice the frequency of input voltage $V_M$.

To overcome the above drawback, one potential solution is to provide a second divider (not shown) at the output 12a, in parallel to divider 15, for receiving a signal proportional to the instantaneous value of output voltage $V_o$. The tap of the additional divider is connected to the input of a hysteresis comparator built into control circuit 8 and which compares the incoming signal with a reference voltage and, in the event that the compared signal exceeds the reference voltage, supplies a turn-off signal to control stage 31, thus turning transistor 34 off until output voltage $V_o$ is restored to a correct value.

Such a solution, however, requires a special pin on control circuit 8 for receiving the signal from the second divider. As such, it cannot be applied to all control circuits 8, particularly those mounted in eight-pin packages in which no pins are available for the purpose. Moreover, in any event, it requires an additional pin, always a scarce resource.

It is an object of the present invention to provide a circuit for detecting voltage variations and which does not require an additional pin for receiving external signals from the output.

SUMMARY OF THE INVENTION

The present invention provides a circuit for detecting voltage variations in relation to a set value.

A preferred, non-limiting embodiment of the present invention detects voltage variations by comparing a signal that is proportional to the output deviation with a reference voltage. This signal is derived within the control circuit and thereby does not require an additional pin on the control circuit package to receive such a signal from an external source. The comparator is included within the control circuit package.

BRIEF DESCRIPTION OF THE DRAWINGS

The foregoing and other objects, features, aspects and advantages of the invention will become apparent from the following detailed description and drawing, which includes the following.

DETAILED DESCRIPTION

Figure 1:
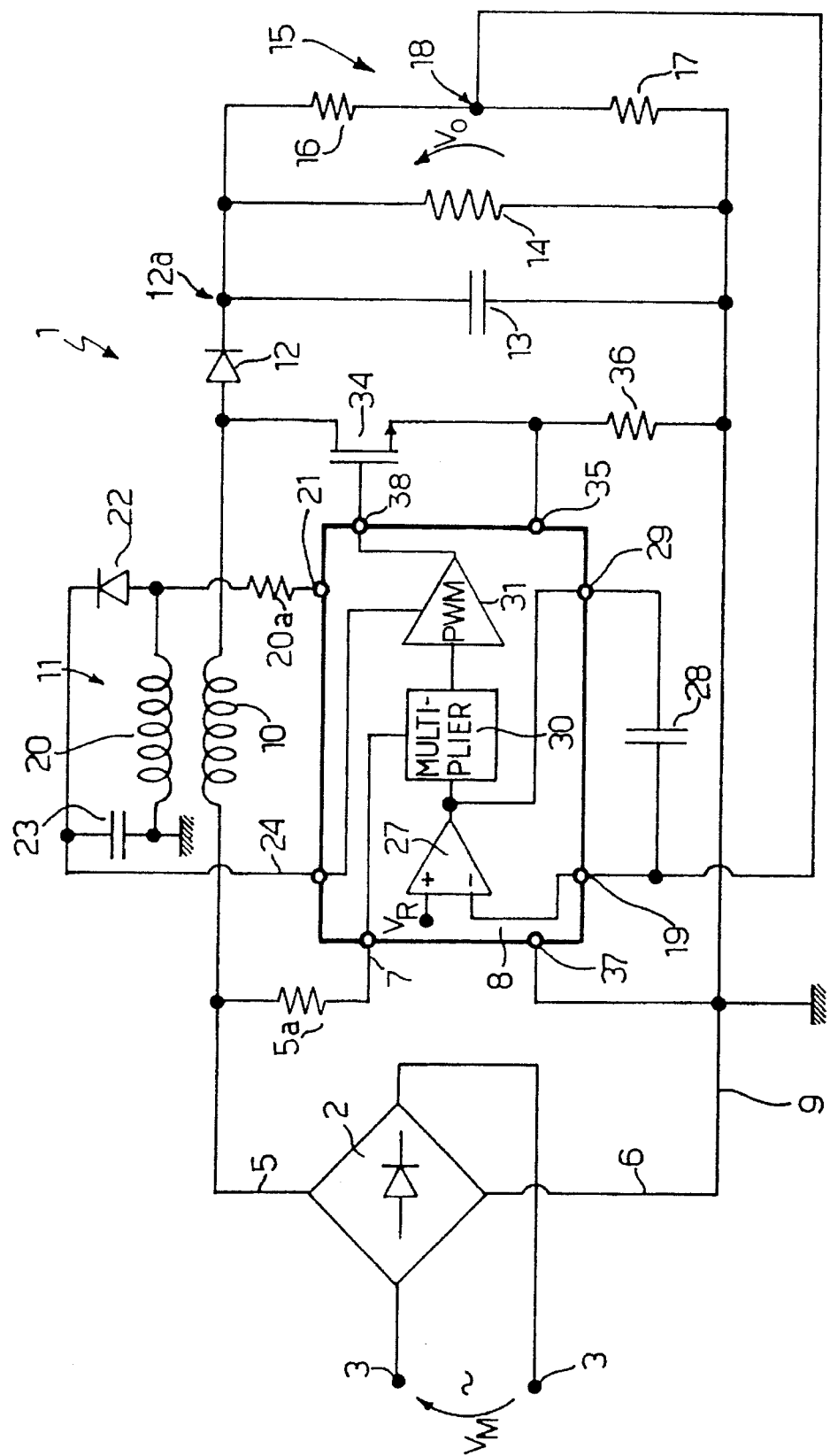
FIG. 1 shows the circuit diagram of a known switch power supply circuit to which the detecting circuit according to the present invention may be applied.
Figure 2:
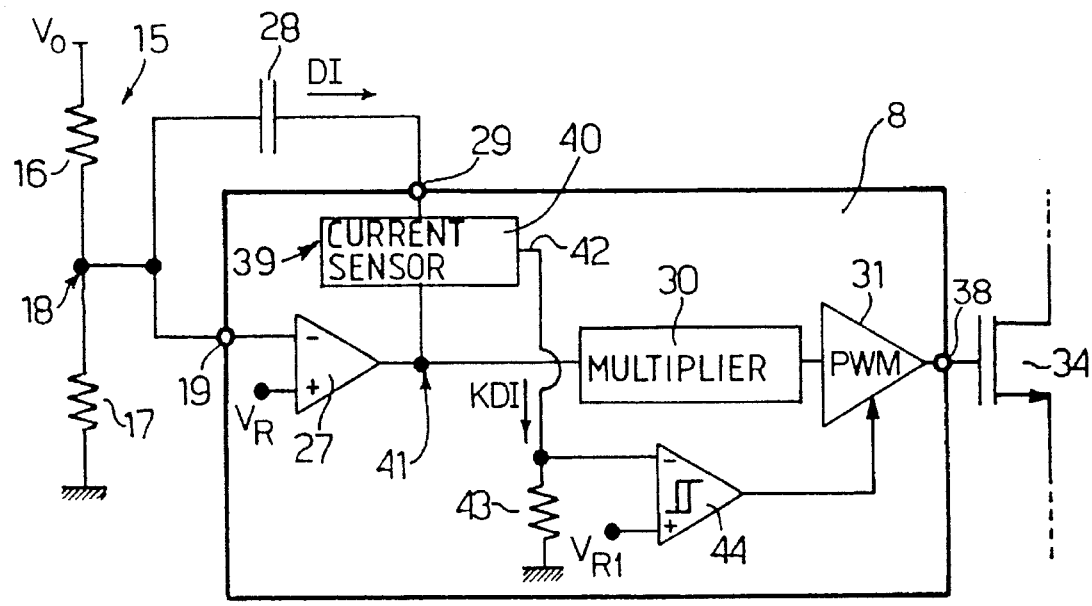
FIG. 2 shows a block diagram of one embodiment of the detecting circuit according to the present invention.

Referring to FIG. 2, only control circuit 8, compensating capacitor 2S, divider 15 and transistor 34 of power supply circuit 1 are shown. All the other components are identical to those in FIG. 1 and will not be reiterated for the sake of clarity. Parts in common with the FIG. 1 diagram are indicated using the same reference numbers.

Circuit 39 in FIG. 2 detects variations in output voltage in relation to a set value by detecting the current through compensating capacitor 28. This current is instantly proportional to variations in output voltage $V_o$.

Circuit 39 is advantageously integrated in control circuit 8 for eliminating the need for an additional pin on the package.

More specifically, circuit 39 comprises a current sensor 40, located between pin 29 and output 41 of error amplifier 27, for generating at current sensor output 42 a signal KDI proportional to the current in capacitor 28. In the FIG. 2 embodiment, current signal KDI is converted into a voltage signal via a resistor 43, connected to current sensor output 42 and ground. Signal KDI is supplied to the negative input of a hysteresis comparator 44. The positive input of comparator 44 is connected to reference potential $V_{R1}$. The output of hysteresis comparator 44 is supplied to control and drive stage 31 for turning off transistor 34 when the output voltage exceeds the threshold defined by reference potential $V_{R1}$.

The FIG. 2 circuit operates as follows. In power supply circuit 1 (refer to FIG. 1), the current through resistor 17 of resistance $R_1$ may be assumed constant and equal to $V_R/R_1$ by virtue of resistor 17 being connected $V_o$ of power supply circuit 1 equals the set value, said to the inverting input of error amplifier 27. Under steady state operating conditions, when output voltage $V_o$ of power supply circuit 1 equals the set value, said current is also equal to the current through resistor 16, connected to the cathode of diode 12 (FIG. 1) and of resistance $R_2$.

Under such conditions, the current through capacitor 28 is therefore zero, and, by virtue of supplying no current, the final stage of error amplifier 27 is in the bias condition.

If, for any reason, a variation occurs in output voltage $V_o$, e.g. an increase of $DV_o$, this is detected only by resistor 16, the current of which will increase by an amount DI equal to $DV_o/R_2$. DI flows through capacitor 28 and is detected by sensor 40, which generates a signal KDI at output 42 proportional to current DI. Resistor 43 thus generates at its terminals a voltage drop proportional to current DI and consequently to $DV_o$, and which is compared with $V_{R1}$ by hysteresis comparator 44, defining an overvoltage limiting circuit. By appropriately setting $V_{R1}$, it is therefore possible to regulate the variation threshold of output voltage $V_o$ above which the output of the hysteresis comparator switches and turns off transistor 34.

According to a preferred embodiment of the present invention, current DI through capacitor 28 is detected by current sensor 40 as the difference between the instantaneous current through the output stage of error amplifier 27 and the bias current of the same, by virtue of both, as stated, being equal under steady state operating conditions of the power supply circuit.

Figure 3:
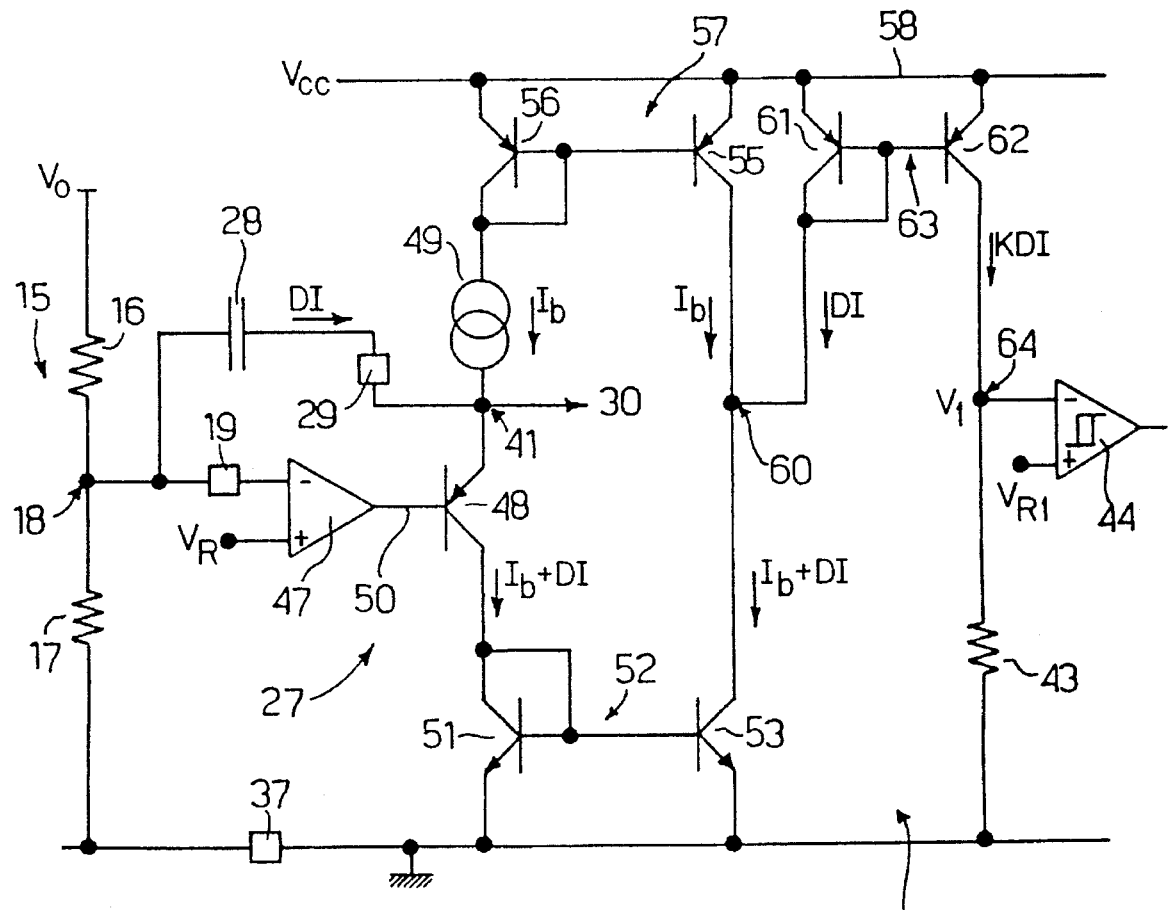
FIG. 3 shows a circuit diagram implementing the FIG. 2 block diagram.

One implementation of the above solution is shown by way of example in FIG. 3, which shows divider 15, including resistors 16 and 17, capacitor 28, resistor 43 and hysteresis comparator 44. In FIG. 3, amplifier 27 is represented by a preamplifier 47 and a final stage, including an output transistor 48 and a current source 49 supplying bias current $I_b$. More specifically, preamplifier 47 presents a positive input at reference potential $V_R$, a negative input connected to pin 19 (and consequently tap 18), and the output 50 connected to the base terminal of output transistor 48, in this case a PNP type. The emitter terminal of transistor 48 defines output 41 of error amplifier 27, while the collector terminal is connected to that of an NPN type transistor 51 of a current mirror circuit 52, forming part of current sensor 40.

The emitter of transistor 51 is connected to ground line 9 (via pin 37), and its base is shortcircuited with the collector and connected to the base of an NPN type transistor 53, thereby forming current mirror circuit 52. The emitter of transistor 53 is grounded and its collector is connected to the collector of transistor 55, forming a current mirror circuit 57 together with transistor 56. Transistors 55 and 56 are both PNP types and have mutually connected bases. The emitters are connected to supply line 58 at potential $V_{CC}$. Transistor 56 has its base terminal shortcircuited with its collector terminal, and current source 49 is provided between the collector of transistor 56 and output node 41 of error amplifier 27, for supplying current $I_b$ to transistor 48.

Node 60 between the collector terminals of transistors 55 and 53 is connected to the collector terminal of transistor 61, forming with transistor 62 a 1:K ratio current mirror circuit 63. Transistors 61 and 62 are both PNP types and present mutually connected base terminals. The emitter terminals are connected to supply line 58. Transistor 61 has its collector terminal shortcircuited with its base terminal; transistor 62 has its collector terminal connected to one terminal of resistor 43, via node 64; and node 64 is connected to the negative input of hysteresis comparator 44.

As already stated with reference to FIG. 2, under steady state operating conditions of the FIG. 3 circuit, the current through capacitor 28 is zero, so that only bias current $I_b$ generated by source 49 flows through transistor 48, which current also flows through transistor 51 and is mirrored to transistor 53. Similarly, current $I_b$ also flows through transistor 56 by which it is mirrored to transistor 55. The same current thus flows through both transistors 55 and 53, while no current flows through transistors 61 and 62, so that node 64 is grounded and the output of hysteresis comparator 44 is high.

Conversely, as stated with reference to FIG. 2, an increase $DV_o$ at the power supply circuit output results in an increase DI in the current of resistor 16, which current flows into capacitor 28 and is injected into output transistor 48, which, at this phase, is supplied with current $I_b+DI$.

Transistor 61 is thus supplied at this phase with current DI, equal to the difference between the current supplied by transistor 55 and that ($I_b+DI$) drawn by transistor 53, and, according to the ratio K between the emitter areas of transistors 61 and 62, mirrors it to transistor 62. The resulting current KDI is supplied to resistor 43, which accordingly generates a voltage drop $V_1$ proportional to variation $DV_o$ and which when it exceeds threshold $V_{R1}$, activates hysteresis comparator 44 for turning off MOS transistor 34.

The advantages of the circuit according to the present invention will be clear from the foregoing description. First, by virtue of detecting variations in output voltage as a function of the current through compensating capacitor 28, the overvoltage detecting components may be integrated in a control circuit 108 with no need for a special pin. This, therefore, provides full implementation of overvoltage detection and limitation on control circuit 108 with fewer pin requirements. Thus, packages that otherwise have an insufficient number of pins can now be implemented. Also, in the case of control circuits with available pins, an additional pin is now available for other purposes.

Second, by virtue of voltage $V_1$ supplied to hysteresis comparator 44 being proportional to $DV_o$ through resistance $R_2$ of resistor 16, it is possible to adjust the instant at which the hysteresis comparator is activated (and consequently the value of the variation in output voltage $V_o$ at which the limiting system is to be activated) by adjusting the value of resistance $R_2$, with no change in reference potential $V_{R1}$. This is particularly advantageous in that it provides for producing identical integrated circuit packages 8 mounted, at the assembly stage, with external components 16 of the appropriate value as required.

Third, by virtue of the reference threshold being compared, not directly with output voltage $V_o$, but with signal $V_1$, proportional to the variation in output voltage, any errors or percentage inaccuracy in reference voltage $V_{R1}$ and/or in the measurement of current DI result in an activation error of hysteresis comparator 44 as a function of voltage variation $DV_o$, and, as compared with the overall error of output voltage $V_o$, are thus reduced by a factor equal to $DV_o/V_o$.

Fourth, the solution described is straightforward in design, readily integratable on the control circuit, and of limited bulk.

Finally, the circuit described provides for a high degree of reliability and may be rendered extremely accurate, despite possible production spread in resistance and the sensitivity of resistor 43 to variations in temperature. In fact, any spread in the resistance of resistor 43 may be overcome by simply calibrating the circuit accordingly, e.g. by adjusting the resistance of resistor 16 as described above, or by calibrating resistor 43, while the sensitivity of resistor 43 to variations in temperature may be overcome quite simply by reference potential $V_{R1}$ varying as a function of temperature in the same way as the resistance of resistor 43.

To those skilled in the art it will be clear that changes may be made to the circuit as described and illustrated herein without, however, departing from the scope of the present invention. In particular, in addition to power supply circuits, as described herein, the circuit according to the present invention may also be applied to other types of devices having an output at which overvoltage is to be detected and possibly limited, and comprising error amplifiers having a feedback branch which, under steady state operating conditions, is not supplied with current, and, in the event of a variation in the output voltage of the device, is supplied with current instantly proportional to the voltage variation.

Finally, though specially designed for integration within control circuits such as control circuit 8 with no need for additional pins, the circuit according to the present invention may also be applied to devices involving no restriction in the number of pins, or in which the detecting circuit need not necessarily be integrated.

The same design solution may also be applied for detecting and possibly limiting negative variations in set voltage, in which case current only flows through the feedback capacitor, though inverted as compared with the example described, under other than steady state operating conditions of the device.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A circuit for detecting voltage variations of an output terminal in relation to a set value, said circuit comprising an error amplifier, having an amplifier input connected to the output terminal and an amplifier output for supplying an error signal, said circuit also comprising a feedback branch connected between said amplifier input and said amplifier output of said error amplifier, said circuit further comprising a current sensor connected to the feedback branch, the current sensor detecting a current through the feedback branch, said current being proportional to the voltage variations of the output terminal and said current sensor generating a signal proportional to the voltage variations at the output terminal.

2. A circuit as set forth in claim 1, wherein said circuit further comprises a biasing circuit for biasing the error amplifier and for generating a bias current supplied to said amplifier output of said error amplifier and wherein the current sensor comprises means for detecting an instantaneous current through said amplifier output and further comprises subtracting means, having inputs connected to said biasing circuit and connected to said means for detecting, for generating a signal equal to a difference between said instantaneous current and said bias current.

3. A circuit as set forth in claim 2, wherein said error amplifier comprises an output stage including a transistor having a first terminal connected to said biasing circuit and to said feedback branch and wherein said means for detecting comprise a first current mirror circuit, having an input terminal connected to a second terminal of said transistor and an output terminal connected to an output terminal of a second current mirror circuit which has an input connected to said biasing circuit said output terminals of said first and second current mirror circuits forming a node connected to an output of said current sensor and thereby defining said subtracting means.

4. A circuit as set forth in claim 1 wherein said feedback branch is capacitive.

5. A circuit as set forth in claim 1 further comprising a voltage limiting circuit, having an input connected to the output of said current sensor, said voltage limiting circuit to limit voltage at the output terminal.

6. A circuit as set forth in claim 5, wherein said voltage limiting circuit comprises a current/voltage converter having an input connected to the output of said current sensor, and that is connected to a comparator.

7. A circuit as set forth in claim 6, wherein said comparator comprises a hysteresis comparator.

8. A circuit as set forth in claim 2 wherein said feedback branch is purely capacitive.

9. A circuit as set forth in claim 3 wherein said feedback branch is purely capacitive.

10. A circuit as set forth in claim 2 further comprising a voltage limiting circuit, having an input connected to the output of said current sensor said voltage limiting circuit to limit voltage at the output terminal.

11. A circuit as set forth in claim 3 further comprising a voltage limiting circuit, having an input connected to the output of said current sensor, said voltage limiting circuit to limit voltage at the output terminal.

12. A circuit as set forth in claim 4 further comprising a voltage limiting circuit, having an input connected to the output of said current sensor, said voltage limiting circuit to limit voltage at the output terminal.

13. An electronic device having an output terminal at an output potential and comprising an error amplifier having an amplifier input connected to said output terminal and amplifier output supplying an error signal, said device further comprising a feedback branch, connected between said amplifier input and said amplifier output, and a circuit for detecting variations in said output potential in relation to a set value, said circuit for detecting comprising a current sensor connected to said feedback branch to detect a current through the feedback branch; said current being proportional to the variations in said output potential.

14. A device as set forth in claim 13 further comprising a biasing circuit for biasing said error amplifier and for generating a bias current to be supplied to said amplifier output, said current sensor comprising means for detecting an instantaneous current through said amplifier output, and subtracting means amplifier, having inputs connected to said biasing circuit and to said means for detecting, for generating a signal equal to the difference between said instantaneous current and said bias current.

15. A device as set forth in claim 13 comprising a voltage limiting circuit having an input connected to said current sensor, said voltage limiting circuit to limit the output potential at the output terminal.

16. A switch voltage power supply circuit having an output terminal presenting an output potential, said power supply circuit comprising an error amplifier, having an amplifier input connected to said output terminal and having an amplifier output for supplying an error signal, a feedback branch connected between said amplifier input and said amplifier output, a control stage cascade connected to said error amplifier; a switch element driven by said control stage and connected to said output terminal; and a means for detecting variations in said output potential in relation to a set value, said means for detecting comprising a current sensor connected to said feedback branch thereby detecting a current through the feedback branch, said current being proportional to the variations in said output potential in relation to said set value.

17. A power supply circuit as set forth in claim 16, comprising a biasing circuit for biasing said error amplifier and for generating a bias current supplied to said amplifier output, wherein said sensor comprising means for detecting an instantaneous current through said amplifier output and comprising means, having inputs connected to said biasing circuit and to said means for detecting an instantaneous current, for generating a signal equal to a difference between said instantaneous current and said bias current.

18. A device as set forth in claim 16 further comprising a voltage limiting circuit having an input connected to said current sensor, said voltage limiting circuit to limit the output potential at the output terminal.

19. A method of detecting voltage variations of an output signal at an output terminal in relation to a first set value comprising the steps of:

receiving the output signal from the output terminal at an inverting input of an amplifier;

comparing the output signal to the first set value;

generating an error signal as a function of a difference between the output signal and the first set value;

feeding back the error signal, through a feedback loop, to the inverting input of the amplifier;

detecting a current in the feedback loop; and generating a current signal proportional to the detected current in the feedback loop;

wherein said current signal is proportional to the voltage variation of the output signal.

20. The method of detecting voltage variations of an output signal at an output terminal as recited in claim 19, futher comprising the steps of:

comparing the current signal to a second set value; and outputting a second error signal representative of a difference therebetween.

21. The method of detecting voltage variations of an output signal at an output terminal as recited in claim 20, further comprising:

controlling a value of the output signal in response to the second error signal.

22. A method of detecting voltage variations of an output signal in relation to a first set value comprising the steps of:

receiving the output signal at a high impedance input terminal;

comparing the output signal received at the high impedance input terminal to the first set value;

generating an error signal as a function of a difference between the output signal received at the high impedance input terminal, and the first set value;

feeding back the error signal, through a feedback loop, to the high impedance input terminal;

detecting a current in the feedback loop; and generating a current signal proportional to the detected current in the feedback loop wherein said current signal is proportional to the voltage variation of the output signal.

23. A method of detecting voltage variations of an output signal as recited in claim 22, further comprising the steps of:

comparing the current signal to a second set value; and outputting a second error signal representative of a difference therebetween.

24. The method of detecting voltage variations of an output signal as recited in claim 23, further comprising the steps of:

controlling a value of the output signal in response to the second error signal.

25. The method of detecting voltage variations of an output signal as recited in claim 22, wherein the step of feeding back consists of capacitively feeding back the error signal.

* * * * *